United States Patent
Chud (10) Patent No.: US 10,511,675 B1
(45) Date of Patent: Dec. 17, 2019

(54) ENDPOINT RESOLUTION SERVICE FOR MOBILE APPLICATIONS ACCESSING WEB SERVICES

(71) Applicant: Amazon Technologies, Inc., Seattle, WA (US)

(72) Inventor: Andrew Christopher Chud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 657 days.

(21) Appl. No.: 14/971,491

(22) Filed: Dec. 16, 2015

(51) Int. Cl.
- *H04L 29/08* (2006.01)
- *H04W 4/02* (2018.01)
- *H04W 4/18* (2009.01)

(52) U.S. Cl.
CPC .......... *H04L 67/18* (2013.01); *H04L 67/1095* (2013.01); *H04W 4/02* (2013.01); *H04W 4/18* (2013.01)

(58) Field of Classification Search
CPC . H04L 67/1095; H04L 29/06; H04L 67/2842; H04L 69/329; H04L 67/1008; H04L 67/327; H04L 67/1002
See application file for complete search history.

(56) References Cited

U.S. PATENT DOCUMENTS

| | | | |
|---|---|---|---|
| 6,223,209 B1* | 4/2001 | Watson | H04L 29/06 709/201 |
| 9,749,174 B1* | 8/2017 | Goff | H04L 29/08153 |
| 2001/0032232 A1* | 10/2001 | Zombek | H04L 1/1635 709/201 |
| 2002/0049842 A1* | 4/2002 | Huetsch | H04L 29/06 709/225 |
| 2009/0210528 A1* | 8/2009 | Swildens | H04L 12/14 709/224 |
| 2011/0320566 A1* | 12/2011 | Edecker | H04L 29/12066 709/217 |
| 2013/0254261 A1* | 9/2013 | Nicholls | G06F 9/5027 709/203 |
| 2014/0201344 A1* | 7/2014 | Copsey | G06F 9/505 709/223 |
| 2014/0267571 A1* | 9/2014 | Periyannan | H04N 7/15 348/14.08 |
| 2015/0088972 A1* | 3/2015 | Brand | H04L 45/126 709/203 |
| 2017/0054792 A1* | 2/2017 | Christopher, II | H04L 67/10 |

* cited by examiner

*Primary Examiner* — Vivek Srivastava
*Assistant Examiner* — Muhammad Raza
(74) *Attorney, Agent, or Firm* — Patterson + Sheridan, LLP (57) ABSTRACT

Techniques are disclosed for providing a software application executed on a mobile device to obtain a set of service endpoints for web services used by that application. As disclosed, an endpoint resolution service may select a service endpoint for a given web service based at least on a geographic proximity of the mobile device to a set of cloud computing regions or data center locations hosting an instance the given web service.

21 Claims, 8 Drawing Sheets

Mobile App Region Configuration

Application ID:  ~405
   3375okgt1F

Required Services and Regions:  ~410
   Sign-In Services:
      US-East, AP-North,
   Compute Service:
      US-West, AP-North, EU-West ~415
   Database Service:
      US-East, AP-North
   Storage Service:  ~420
      'Global Stack'
   Analytics Service:
      US-East, AP-North

FIG. 4A

| ERS – Response Message | | 455 | |
|---|---|---|---|
| Service | Region | Endpoint | Protocol |
| Sign-In | US-East | cognito-identity.us-east-1.amazonaws.com | HTTPS |
| Compute | US-West<br>EU-West | lambda.us-west-1.amazonaws.com<br>lambda.eu-west-1.amazonaws.com | HTTPS |
| Database | US-East | rds.us-east-1.amazonaws.com | HTTPS |
| Storage | US-East | s3-external-1.amazonaws.com | HTTP/<br>HTTPS |
| Analytics | US-East | mobileanalytics.us-east-1.amazonaws.com | HTTPS |

ENDPOINT RESOLUTION SERVICE FOR MOBILE APPLICATIONS ACCESSING WEB SERVICES

Embodiments presented herein relate to applications for mobile computing platforms, such as mobile telephones and computing tablets. More specifically, embodiments presented herein provide an endpoint resolution service used to provide a mobile application with a set of service endpoints for a corresponding set of web services.

Cloud computing has become a widely adopted approach for providing users with access to applications and data. One of the primary technologies underlying cloud computing is virtualization. Virtualization allows a physical computing server to host multiple virtual machine instances, each of which executes as an independent computing system with virtual hardware components, such as a CPU and memory, managed by an operating system.

Application developers can use VM instances to host applications and services provided to customers, without having to invest in and maintain the underlying physical computing infrastructure. In addition to providing compute services (e.g., virtual machine instances), a cloud computing provider may offer a variety of other computing resources and services which developers can use in building applications and services provided to users. For example, web services may include database services, storage services, networking services, load balancing services, auto-scaling services, messaging services, cloud formation services, system monitoring, data analytics, federated identity and access management, etc. Cloud computing providers frequently offer web services from data centers in a variety of different geographic locations—sometimes referred to as cloud computing regions.

Computer software applications—or "apps"—have long grown beyond individual software applications which are installed and run on a single computing system, such as a desktop or laptop computer. Instead, apps have become widely available for a variety of additional computing devices and platforms including, e.g., mobile phones, computing tablets, video game consoles, digital media players, television display panels, vehicle entertainment and information systems, wearable computing devices, etc. Further, the range and variety of computing platforms which support apps is likely to continue to grow. Apps are commonly distributed through online distribution services that allow users to download and install an app on a given computing device and such distribution services may be global in scope. For example, an "app store" may provide a global distribution platform for apps related to social media, productivity, health and fitness, streaming video, electronic games, commerce, image editing, to name just a few.

While some apps execute on a mobile device in entirely local manner, apps frequently communicate and interact with other computing systems, including cloud-based systems or web services. The broad variety of cloud-based web services allows application developers to build apps where both data storage and execution logic for the app occur on the cloud-based systems and web services. For example, an app running on a computing tablet may access a data storage service exposed using web services to access data files presented to a user operating the app on the computing tablet. Of course, at some point, an app obtaining services or data from "the cloud" needs to connect to and communicate with actual computing systems. To do so, a developer typically binds the app in code to a specific endpoint for each web service used by the app. That is, a developer my configure a mobile app to access applications, services, and data in "the cloud" by connecting to specific computing systems using specific network addresses built into the app before it is distributed to users.

While this works as intended, it results in apps that connect to the same web services and data, regardless of where the app is being used or where the app is distributed. This can be problematic for mobile app developers who publish their apps globally. For example, doing so results in an app that may be responsive for users in the same general geographic location as the cloud computing region coded in the app but perform increasingly poorly as a user moves further away from the cloud computing region (or simply acquires the app from a distant location to the cloud computing region).

DETAILED DESCRIPTION

Embodiments presented herein provide a platform used to dynamically provide software applications or "apps" with a set of service endpoints for cloud-based application or web services used by the app each time the application is launched. Instead of binding the app to a specific set of service endpoints in code, this approach allows the app to obtain the best available endpoints for each respective service from anywhere in the world (which may be different endpoints for different services used by the app). Thus, when a user launches the same app from different geographic locations, that user may receive different service endpoints for the cloud-based services backing the app, but interact with the same set of cloud-based services and data. Similarly different mobile devices using the app from different locations can receive a different set of user endpoints, but interact with the same set of web services and data.

When a user launches the app on a mobile device (e.g., on a smartphone or computing tablet), the app sends a message to a global endpoint resolution service requesting service endpoints for the web services used by the app. For example, the web-services provider may generate a code layer for mobile apps (or provide developers with a software development kit (SDK)) which call the endpoint resolution service as part of bootstrapping or launching the app. In response, the endpoint resolution service may examine both a publicly visible IP address in the request and a region configuration specified for the app by a developer to determine the best-available service end-points for each web service. Based on the results, the app may access the service endpoints received from the endpoint resolution service. For example, the app may invoke functions supported in the SDK to access web services via the service endpoints. The SDK may also send a request to the endpoint resolution service to repeat this provisioning process, e.g., when the mobile device changes what network is used to communicate with the web services or at periodic intervals.

Note, as some cloud-based may not be available in all regions (or the region configuration specified by the app may limit which regions are used to provide backend services for a mobile app) the end-points for different services need not be the same. A developer may specify a specific set of cloud computing regions which host the web services used by the app. For example, the developer may configure the app such that cloud computing regions closest to an expected user base are used, while omitting other regions. In other cases, a developer may specify a 'global stack'—meaning that the app should be able to access the web services used by the app from any data center or cloud computing region in which the provider offers a given web service. To make the web services available in the regions specified by the region configuration, the web services may replicate data across the cloud computing regions specified in the region configuration of the app. For example, the service provider may replicate data from web services such as user identity, storage, database, compute, data analytics, etc.

Advantageously, this approach allows a mobile app executing on a mobile device anywhere around the globe to communicate with a cloud computing region which is closest in geographic proximity to that mobile device (or least with the closest region enabled for a given web service needed by the application). Further still, this approach provides a simplified solution for mobile developers, as the developer does not need to choose a fixed, specific region per service. Further, the endpoint resolution service may return a redundant or next-closest endpoint for one or more of the web services. Thus, should one cloud computing region (or service in that region) become temporarily unavailable; the mobile app can choose the next-closest service end-point, improving the reliability and availability of the app.

Note, certain embodiments of the invention are described below using a mobile telephone or "smartphone" as a reference example of computing device which can request service endpoints for web services from the endpoint resolution service discussed herein However, one of ordinary skill in the art will recognize that embodiments described using a smartphone may be adapted for a broad variety of computing devices, including computing tablets, desktop or laptop computers, as well as any other computing device which can run software applications and communicate with web services over data communication networks.

Figure 1:
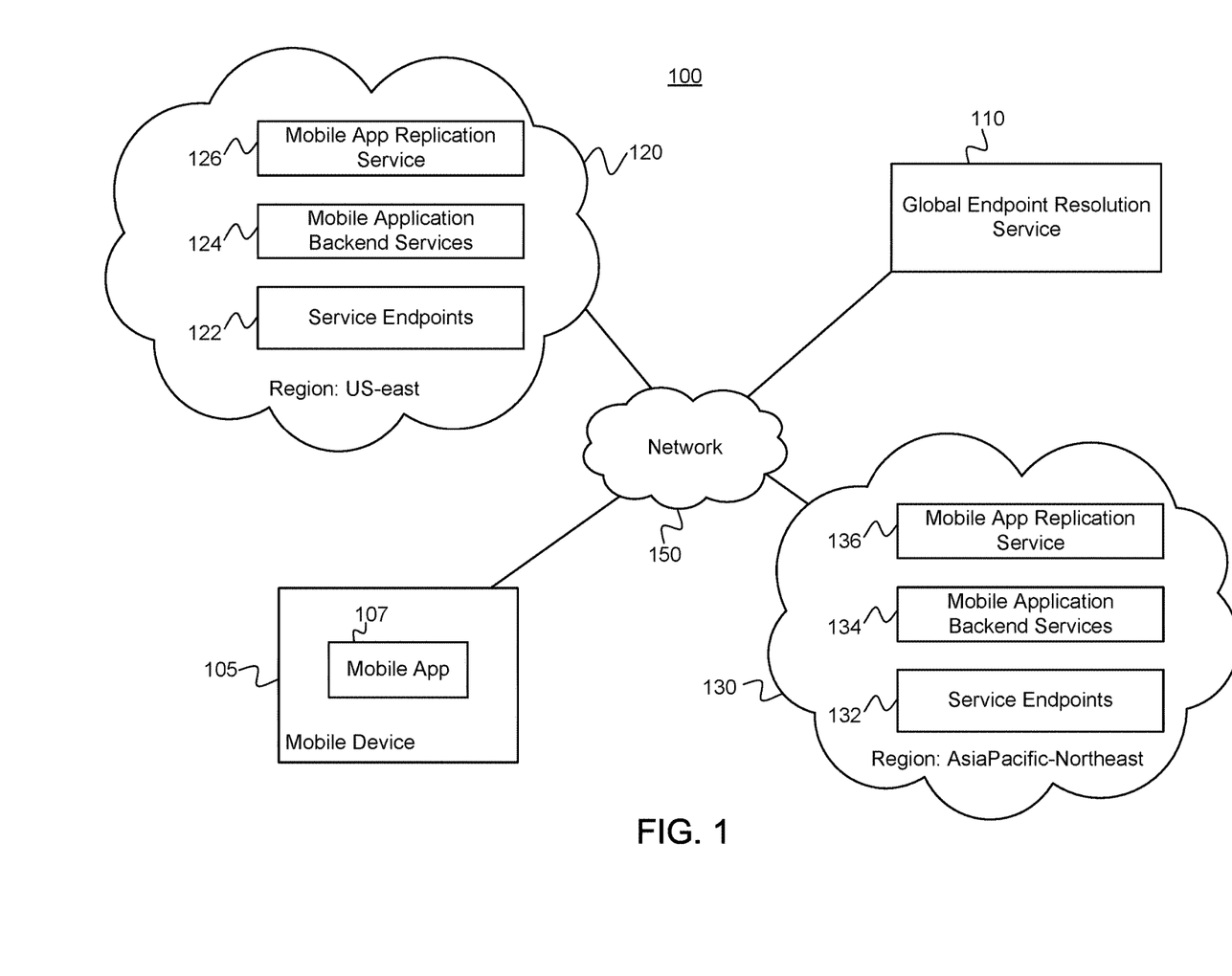
FIG. 1 illustrates an example of a computing environment used to provide an endpoint resolution service which can provide mobile applications with a set of service endpoints for accessing web services, according to one embodiment.

FIG. 1 illustrates an example of a computing environment 100 used to provide an endpoint resolution service which can provide mobile applications with a set of service endpoints for accessing web services, according to one embodiment. As shown, the computing environment 100 includes a mobile device 105, cloud computing region 120, cloud computing region 130, and a global endpoint resolution service 110, each connected to a network 150, (e.g., the internet). Mobile device 105 is configured to be representative of a variety of computing devices including, e.g. computing tablets and smart phones configured with applications, web browsers and other software.

Cloud computing regions 120 and 130 both generally correspond to a region defined by a service provider in offering web services to client systems (e.g., to mobile app 107 on device 105). Within each cloud computing region 120, 130, developers may provision, launch, and manage virtualized computing resources. The deployment and management of the computing services in regions 120 and 130 are generally isolated from others. More specifically, cloud computing regions 120 and 130 may each correspond to a data center (or data centers) located in a particular geographic area. Data centers in different regions may help provide fault-tolerant web services, e.g., should one data center in a region become inaccessible, other data centers in that region (or other regions) may continue to operate with little or no interruption to the webs services themselves. Further, the provider may enable multiple physical or logical zones within a given cloud computing region. For example, a single data center used to provide a cloud computing region may offer multiple, fault tolerant availability zones, where a service disruption in one availability zone should not impact other availability zones within the same cloud computing region (or other regions). While cloud computing regions may be drawn along arbitrary boundaries, cloud computing regions often correspond to geographic, national, or fault tolerance boundaries. For example, as shown in FIG. 1, cloud computing region 120 is named "US-East" and cloud computing region 120 is named "Asia-Pacific-Northeast," indicating the general geographic location of data centers hosting the services offered in these regions (of course the services offered from such geographic regions may be accessed from anywhere in the world).

As shown, cloud computing region 120 includes service endpoints 122, mobile application backend services 124, and mobile app replication service 126. Similarly, cloud computing region 130 includes a service endpoints 132, mobile application backend services 134, and mobile app replication service 136 Service endpoints 122 and 132 provide a domain name (i.e., a network location) for a network service which applications may use to access web services in regions 120 and 130, respectively. For example, each service endpoint 122 and 132 may be represented as a fully qualified domain name accessed using the HTTP/HTTPS (or other) protocols. In practice, the domain names may resolve to an IP address for a load balancing service sitting in front of the actual computing service corresponding to the domain name.

Mobile application backend services 124 and 134 represent instances of the computing or web services offered by the cloud computing provider in regions 120 and 130, respectively, which are used by mobile app 107. The backend services 124 and 134 generally correspond to instances of cloud-based services which have been, provisioned, configured, and launched by an app developer to support mobile app 107. As an example, assume mobile app 107 provides an application used to manage and share digital camera images captured by mobile device 105. In such a case, the mobile backend services 124 and 134 could include an app-specific instance of a user-sign on service, allowing mobile app 107 to authenticate a given user when accessing backend services 124 or 134. Backend services 124 and 134 could also include an instance of a storage service used to store digital images for the mobile app 107 in "the cloud" and an instance of a database service used to store image metadata, allowing users to search for images. Backend services 124 and 134 could also include an instance of a mobile analytics service used to provide a developer of app 107 with a variety of performance metrics and other data related to the use of app 107.

In one embodiment, the global endpoint resolution service 110 provides software and services deployed to provide mobile app 107 with a set of service endpoints based on the then-current location of the mobile device 105 and a region configuration specified for the mobile app 107. The endpoint resolution service 110 may include (or access a third-party) geolocation service which can determine a geographic location of the mobile device requesting a set of service endpoints based on the IP address present in the request (or other network data available to the endpoint resolution service 110). For example, when launched on mobile device 107, the mobile app 107 may send a request for service endpoints to the endpoint resolution service 110. In response, the endpoint resolution service 110 may identify a public IP Address of the mobile device 105 in the request and determine a location of the mobile device 107. Depending on the determined location, the endpoint resolution service 110 may send a set of service endpoints for region 120 (i.e., service endpoints 122) or region 130 (i.e., service endpoints 132) depending on the location of the mobile device 107. In this example, when app 107 is launched, the endpoint resolution service 110 may send a service endpoint for each web service in either the US-East region or the Asia-Pacific-Northeast region based on the then-current location of the mobile device. Note, because the web services operate independently from one another (and because some services may not be available in both regions 120 and 130), the endpoint resolution service 110 may send service endpoints for individual services in both regions 120 and 130. In addition, the app 107 may reinitiate the provisioning process, e.g., when the mobile device 105 changes what network is used to communicate with the web services or at periodic intervals.

Mobile app replication service 126 and 146 provide software managed by a cloud-services provider to replicate the services and data used by mobile app 107 in one region to other regions. That is, replication service 126 may capture data used by mobile app 107 and backend services 124 in region 120 and replicate such changes to region 130 (making such data available to backed end services 134). Conversely, replication service 136 may capture data used by mobile app 107 and backend services 134 in region 130 and replicate such data to region 120 (making such data available to backed end services 144). While any suitable approach for replicating data across regions may be used, in one embodiment, data may be replicated using asynchronous processes which share changes in data made in one region with other regions.

Figure 2:
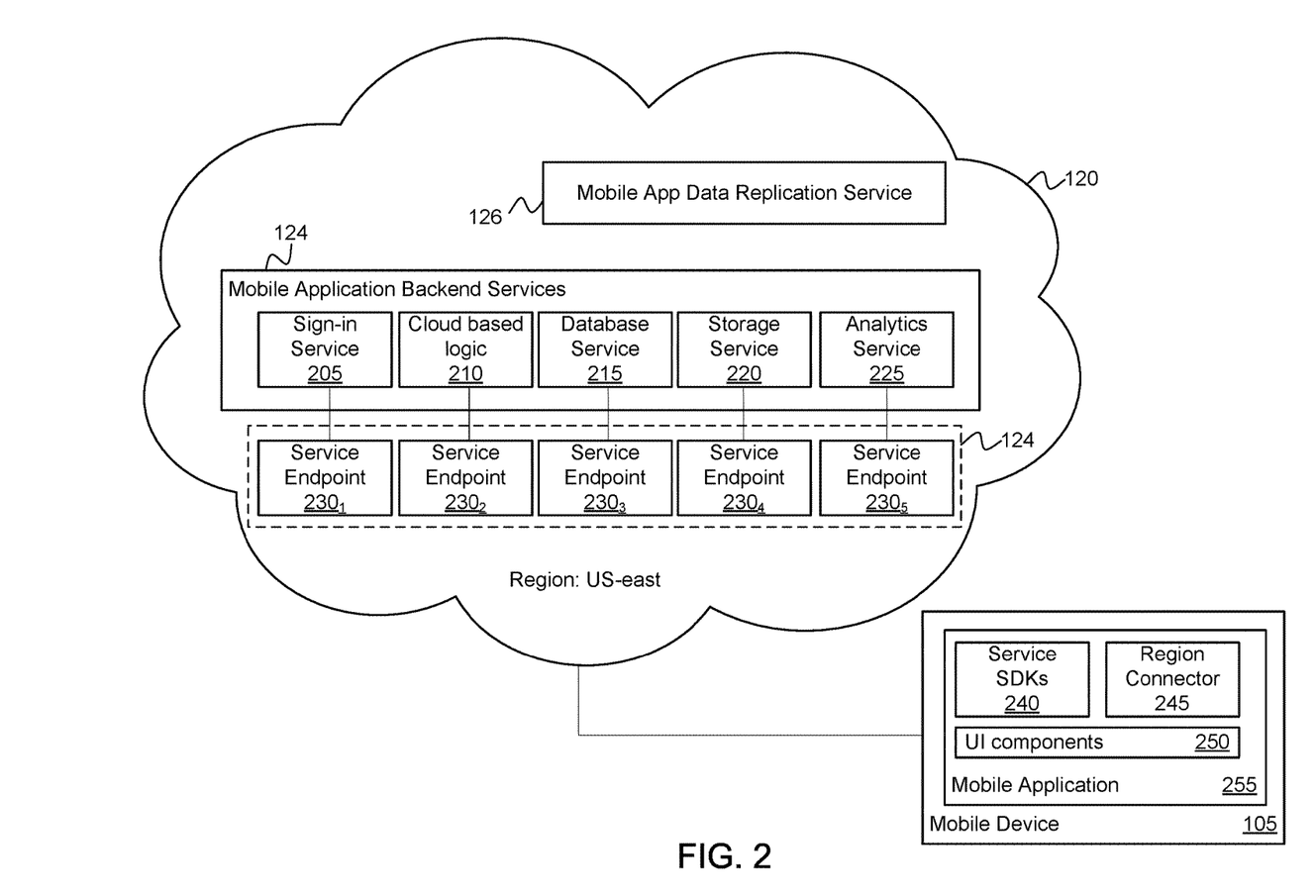
FIG. 2 illustrates a set of web services accessed by a mobile app using service endpoints provided by an endpoint resolution service, according to one embodiment.

FIG. 2 illustrates further illustrates the cloud computing region 120 first shown in FIG. 1, along with a set of web services 205-225 accessed by a mobile app 255 on a mobile device 105 (e.g., a smartphone) using service endpoints $230_{1-5}$, according to one embodiment. As shown, the mobile application backed services 124 include a sign-in service 205, a cloud-based logic service 210, a database service 215, a storage service 220, and an analytics service 225. In turn, each of the web services 205-225 may be accessed using a corresponding service endpoint $230_{1-5}$.

Again using the example of a mobile app 255 used to manage digital images, the mobile application 255 may access the backend services 124 to access digital images captured on the device 105 (or on other devices) which have been pushed to "the cloud" for a given user account. For example, the sign-in service 205 (accessed via service endpoint $230_1$) may allow a mobile app 255 to authenticate a user identify with the backend service 205 in order to be granted access to the digital images associated with a given user account. Cloud based logic 210 (accessed via service endpoint $230_2$) may be used to execute any applicable logic or routines on behalf of the mobile application 255. For example, the mobile application 255 may access cloud based logic 210 to invoke a variety of functions used to evaluate image content, assign metadata or other tags to an image, or apply a variety of visual effects to the digital images pushed to "the cloud."

Database service 215 (accessed via service endpoint $230_3$) may be used to store image metadata (or other data) used by the mobile application 255. For example, the database service 215 could store metadata assigned to images by a user, contacts for sharing images with other users, or sources to import image data. Storage service 220 (accessed via service endpoint $230_4$) may be used to store the actual image data associated with a given user account.

Lastly, analytics service 225 (accessed via service endpoint $230_5$) may provide a developer with information about the performance and use of the mobile app 255 across a user base. For example, the analytics service 225 could measure app usage and app revenue. Accordingly, analytics service 225 could track key trends such as new vs. returning users, app revenue, user retention, and any custom in-app behavior events relevant to a particular mobile app 255. In the present context, e.g., the analytics service 225 could track locations of mobile users to help a developer tailor a region configuration for service endpoint resolution based on the geographic distribution of the user base. Of course, an image sharing app is just an example of a mobile application 255 that can access a set of cloud-based mobile app backend services 124, and the particular group of web services used by mobile app 255 will depend on the intended function and use the mobile app 255.

As shown, the mobile application 255 may itself include a set of service SDKs 240, a region connector 245, and a set of user interface components. In one embodiment, the service SDKs 240 provide the APIs and interface definitions used by the mobile application 255 to access the backend services 124 (i.e., web services 205-255). Typically, each web service 205-225 may have a corresponding SDK 240 that allows a developer to build mobile application (i.e., mobile app 255) which can access the cloud computing platform exposed by the service provider via service endpoints $230_{1-5}$ and a set of APIs included in the service SDKs 240.

In one embodiment, the region connector 245 provides software components of the mobile application 255 that connect to the endpoint resolution service when launching the application 255 (or at other times). More specifically, the region connector 255 may send a message to the endpoint resolution service requesting a set of service endpoints for the mobile app 255 each time the mobile app 255 is launched. Once the service endpoints are obtained, the SDKs 240 can connect to and access the web services 205-225 via the provided service endpoints. The user-interface components 250 provide a visual interface to the mobile app 255 to a user. Again using the example of mobile device app used to manage digital images stored in "the cloud," the UI components 250 may include user interface elements tailored for a touch screen on a mobile phone, e.g., graphical buttons, sliders, text boxes, etc., used to access, view, share, edit, or otherwise manipulate such digital images.

Figure 3:
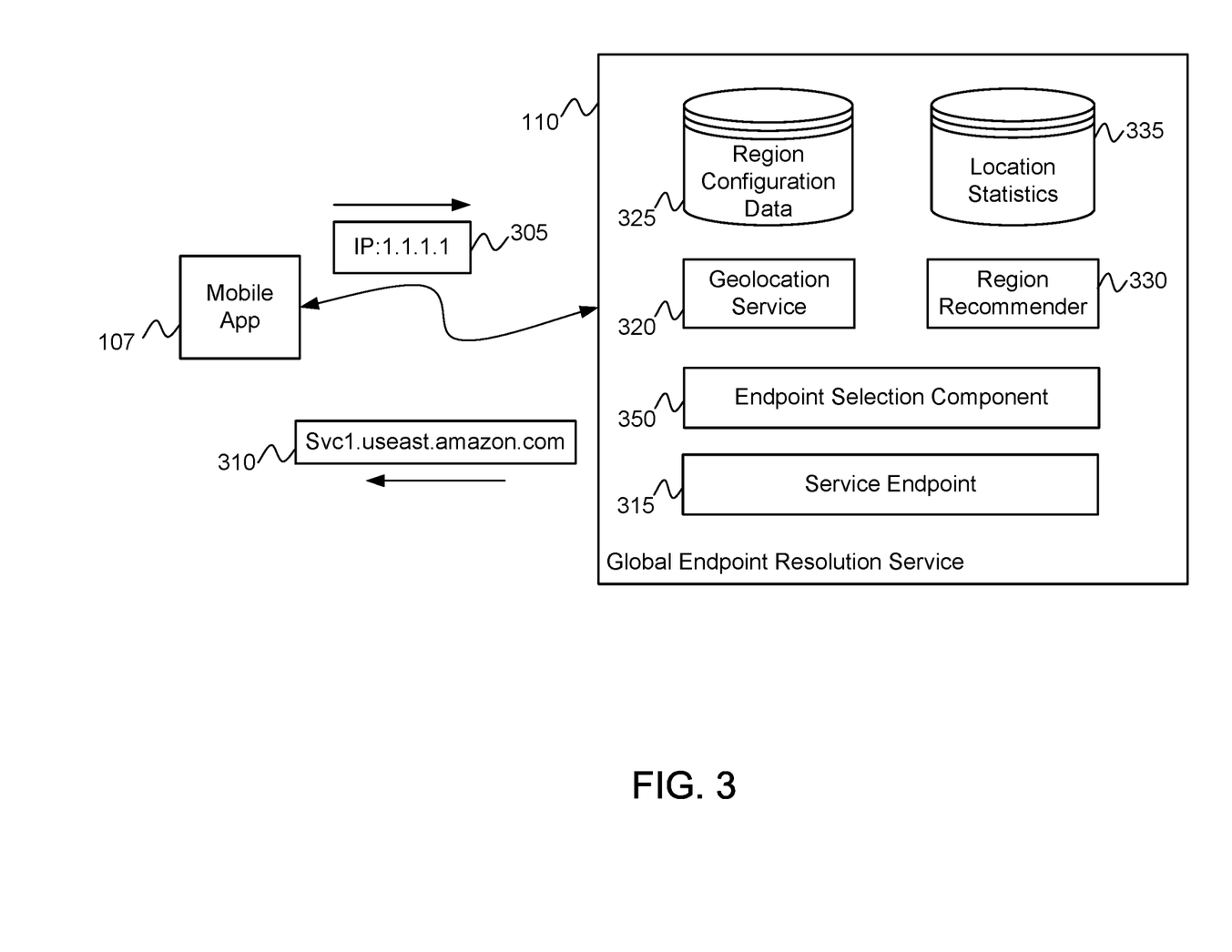
FIG. 3 illustrates an example of a global endpoint resolution service for applications which access cloud-based computing resources or web services, according to one embodiment.

FIG. 3 illustrates an example of a global endpoint resolution service endpoint resolution service 110 for mobile applications which access cloud-based computing resources, according to one embodiment. As shown, the endpoint resolution service 110 includes a global service endpoint 315, a geolocation service 320, region configuration data 325, region recommender 330, location statistics 335, and an endpoint selection component 320.

In one embodiment, the global service endpoint 315 provides a network accessible endpoint (e.g., a URI) for the endpoint resolution service that mobile app 107 may access from anywhere in the world. In practice, instances of the endpoint resolution service 110 may be replicated in each cloud computing regions maintained by a cloud computing service provides and the particular instance accessed may be the result of a DNS resolution of the service endpoint providing a network address of a regional endpoint resolution service 110. In any event, the endpoint resolution service 110 may generally be configured to respond to a request 305 from a mobile app 107 for a set of service endpoints to use to access the backend web services used by mobile app 107.

The endpoint selection component 320 may be configured to determine what service endpoints to return to a requesting mobile app 107. In turn, the mobile app may use the specified service endpoints use to access web services during a run-time session. In one embodiment, the endpoint selection component 320 may use the IP address in request 305 (1.1.1.1 in this example) to determine a then-current geographic location of the mobile app 107 when the request was made. For example, the geolocation service 320 may return a country code, city name, region, geospatial coordinates, or other indication of a location associated with a public IP address in the request 305. In one embodiment, the endpoint selection component 320 may use the determined location along with the region configuration for a given app (available in the region configuration data 325 replicated to each instance of the endpoint resolution service 110) to select what service endpoints the mobile app 107 should use at run-time to access the web services associated with the mobile app 107.

In this example, a response 310 includes a domain name of a network location of a service endpoint the mobile app 107 should use to access an access a "svc1" service in the "US-East" region (i.e., region 120 shown in FIG. 1). Using FIG. 1 as an example, the endpoint selection component 320 could have selected service endpoints in either the US-East region (region 120) or the AP-Northeast region (region 130). The choice of the "Svc1.useast.amazon.com" service endpoint could occur because the endpoint selection component 320 determines that the mobile app 107 is in closer geographic proximity to region 120 than region 130. For example, the endpoint selection component 320 could sort a distance from the determined location to a location representing each cloud computing region identified in the region configuration data 325 and return the top 1, 2, (or N) regions. However, this could also occur because the region configuration data 325 for the mobile app 107 specified only the US-East region or because the relevant web services are not available from other regions.

In other cases, the endpoint selection component 320 could rely on the estimated (or measured) latency for the mobile app 107 and the available cloud computing regions to select a region for each service. In such a case, the location statistics 335 could include latency information between different geographic locations and cloud computing regions. For example, instances of mobile app 107 could report latency from a then-current location when accessing the various backend web services used by such instances. In one embodiment, e.g., the SDKs used to access the individual web services included in the mobile APP report on latencies for service calls. The web services themselves could also report on service latencies observed for different clients. In such a case, the endpoint selection component 350 could correlate service latencies based on the service endpoints vended to given mobile app 107 and the determined location of a mobile device. Latency information could also be provided and maintained by dedicated software agents around the world, e.g., agents at edge locations of a content distribution network could periodically sample and report on service latencies in reaching different services.

In one embodiment, the location statistics 335 are captured by the endpoint resolution service 110 as mobile apps 107 request service endpoints. The location statistics 335 may reflect a geographic distribution of a user base of the mobile app 107 and can be used to identify both a current distribution of users, trending changes in the distribution over time, as well as other statistics. In turn, the region recommender 330 could suggest changes to the region configuration data 325 to reflect where users are located. For example, assume a developer publishes an app and expects a user base to grow in the United States. However, for a variety of reasons, including the ease in global distribution of apps using online marketplaces or "app stores," the popularity of the app may grow in unexpected regions as well as change or over time. Thus, the location statistics 335 and region recommender 330 can help a developer select a regions configuration 107, and avoid the expense of replicating data in regions with relatively fewer users (and better serve regions with relative more users).

Figure 4A:
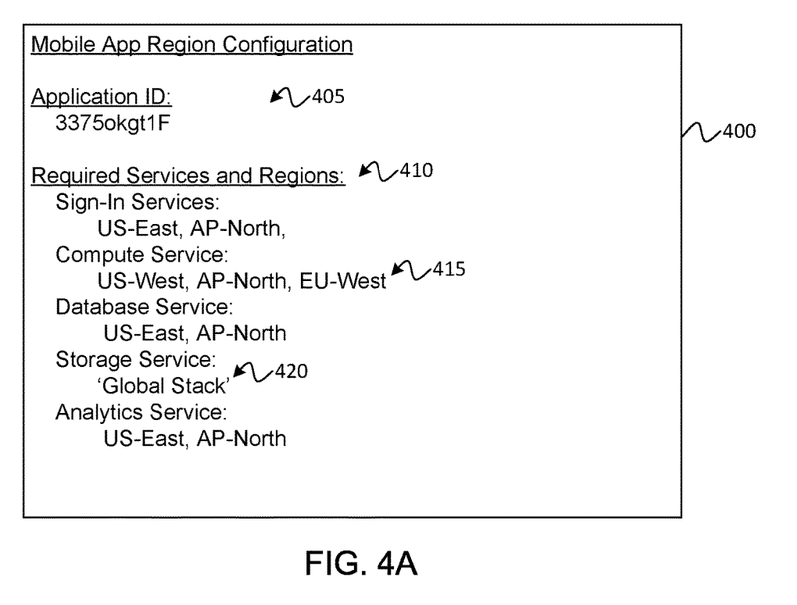
FIG. 4A illustrates an example of region configuration data for a mobile application, according to one embodiment.

FIG. 4A illustrates an example of region configuration data 400 for a mobile application, according to one embodiment. As shown, the region configuration data includes an application or ID 405, a list of web services 410. Each entry on the list identifies a set of regions which are configured with the corresponding web service. In this example, the application ID 405 is a random value generated as a unique identifier for a mobile app. The application ID 405 may be passed to the endpoint resolution service 110 by any instance of the app undergoing the bootstrap process (or requesting an update to service endpoints) and connect to the mobile backend services used by a given mobile application.

The list of web services 410 identify what web services (e.g., the mobile application backend services 124 shown in FIG. 2) are used by the mobile app 107 corresponding to the region configuration data 400. In this example, the web services used by the mobile app 107 include sign-in, compute, database, storage, and analytics (e.g., the cloud computing services 205-225 used to provide a digital image sharing app described above relative to FIG. 2. And the regions listed below each service entry identify what cloud computing regions the endpoint resolution service can select from in selecting service endpoints to send to a mobile application. Once selected, the endpoint resolution service 110 can send a response message back to the requesting mobile app specifying one or more cloud computing regions for each web service in the list 410.

In this example, the sign-in, database, and analytics services are shown as being configured for the mobile application in both the "US-East" and "AP-North" regions, while the compute service 415 is shown as being configured in the US-West and EU-West regions. This could occur if the compute service was not hosted in the US-East region (or simply as a matter of developer preference in what regions are used to offer the individual services). Also, the storage service 420 references a 'global-stack' attribute meant to indicate that any cloud computing region from which the storage service is available may be used by the mobile application. Continuing with the example of a photo sharing app, using the 'global-stack' attribute for the storage service 420 could result in the digital images stored in "the cloud" to be replicated in each computing region available from the cloud computing provider.

Figure 4B:
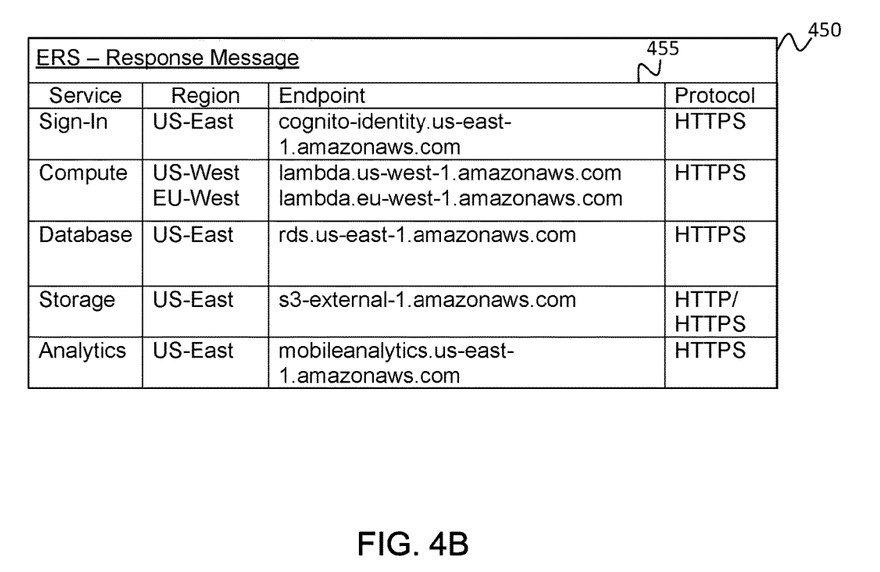
FIG. 4B illustrates an example of an endpoint resolution service response message 450 which provides a set of service endpoints to a requesting application, according to one embodiment.

FIG. 4B illustrates an example of an endpoint resolution service response message 450 which provides a set of service endpoints to a requesting application, according to one embodiment. As shown, the response message 450 includes a table 455 which provides a regional service endpoint for each service listed in the set of required services 410 of the region configuration data 400. For example, the sign-in service is located in a region named US-East, accessed at a service endpoint of "cognito-identity.us-east-1.amazonaws.com." Accordingly, a mobile app receiving message 450 from the endpoint resolution service may connect to the sign-in service using the HTTPS protocol at this designated service endpoint. The remaining entries in table 455 each include a URI which identifies a region along with the actual service endpoint and a protocol for communicating with one of the services.

Note, in this example, each entry in table 455, apart from the compute service, are in the US-East region. This could occur because the geolocation service reports that the mobile device is currently closest to data centers in the US-East region, but the compute service might not be available from the US-East region (or was currently inaccessible). In such a case, the US-West region could be the region in closest proximity to the mobile device. As noted, the endpoint resolution service message 450 could include both a primary and a secondary service endpoint (or more service endpoints) for any of the web services needed by a mobile app. For example, as shown in table 455, the compute service includes service endpoints for both the "US-East" and "EU-West" regions indicating that the compute service can be accessed from either region. Also note, while FIG. 4A and FIG. 4B present the region configuration 400 and endpoint resolution service response message 450 in a readable textual format, in practice, the region configuration data 400 and endpoint resolution service response message 450 may be generated in a machine readable interchange format, such as a JSON or XML formatted document.

Figure 5:
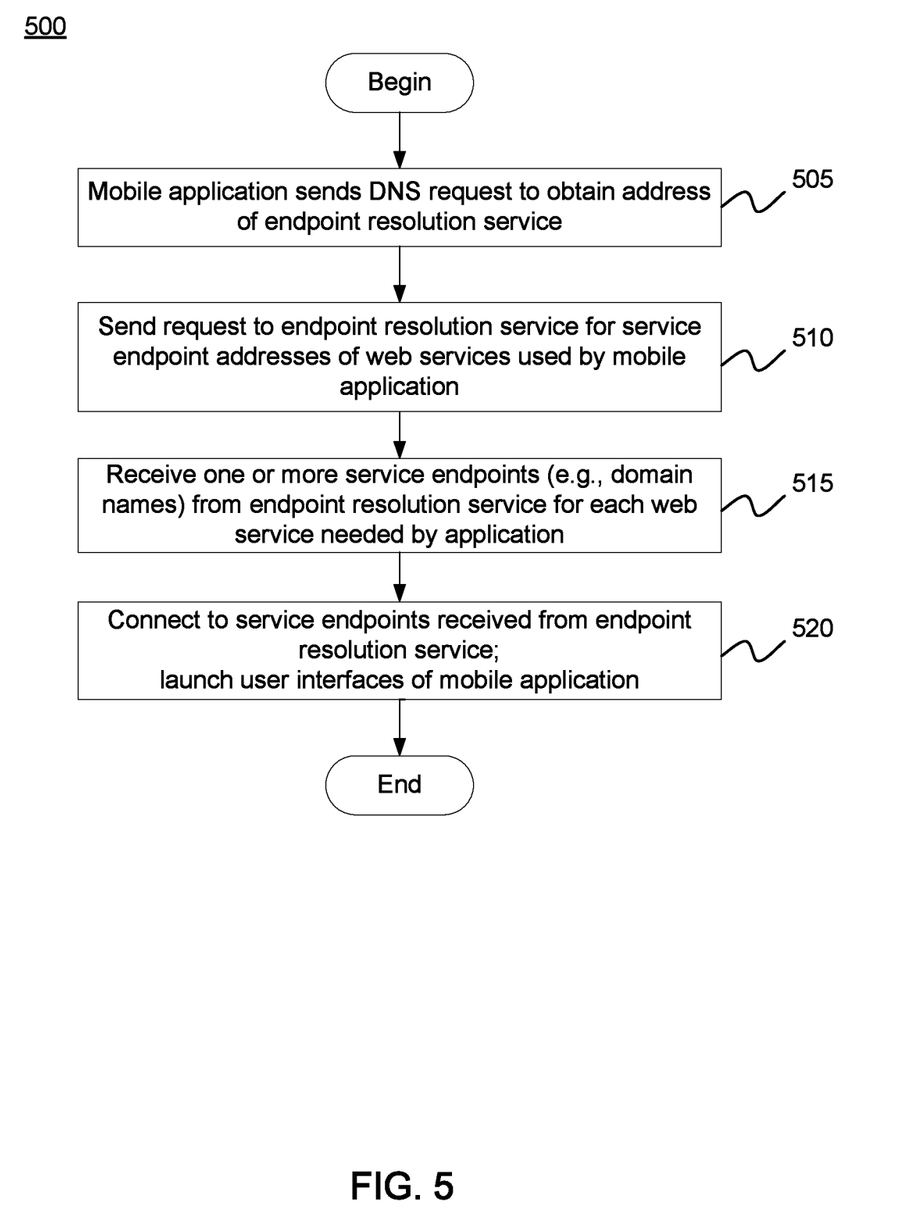
FIG. 5 illustrates a method for a mobile application to request a set of service endpoints for web services used by the mobile application, according to one embodiment.

FIG. 5 illustrates a method 500 for a mobile application to request a set of service endpoints for web services used by the mobile application, according to one embodiment. As shown, the method 500 begins at step 505, where a mobile application sends a DNS request for a network address of the global endpoint resolution service. At step 510, after receiving a network address for the endpoint resolution service, the mobile application may send a message to the endpoint resolution service to obtain a service endpoint for each web service needed by the mobile application. As noted, the mobile application may send such a request each time the mobile application is launched. The request could also be sent when the mobile application switches from one network to another (indicting a change in location), when the app is resumed after being suspended or running as a background process, or simply at periodic intervals.

At step 515, the mobile application receives a response specifying one or more service endpoints for each web service used by the application. Each service endpoint may provide a network location, e.g., a domain name corresponding to one of the web services in one of the cloud computing regions. If multiple service endpoints are provided for a given web service, the response may specify an ordering for the mobile application (e.g., a primary service endpoint and a secondary service endpoint). At step 520, the mobile application connects to the web services using the set of service endpoints provided by the entity resolution services, as needed to provide the intended functionality of the mobile application. As noted, changes made to data while the mobile application interacts with a given web service may be replicated to other cloud computing regions hosting a corresponding instance of the given web service.

Figure 6:
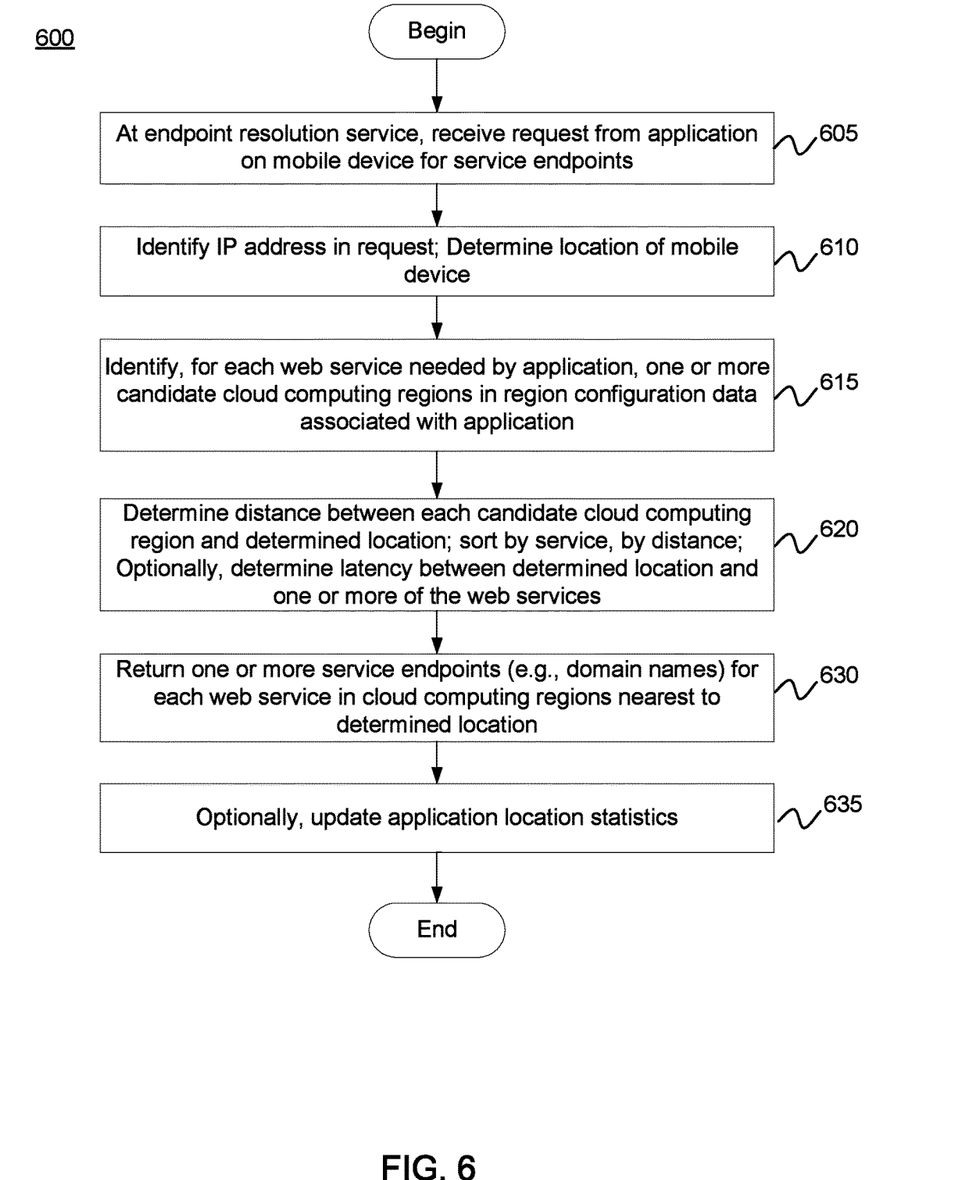
FIG. 6 illustrates a method for a global endpoint resolution service to provide mobile applications with a set of service endpoints based on a current location of the mobile device, according to one embodiment

FIG. 6 illustrates a method 600 for a global endpoint resolution service to provide a mobile application with a set of service endpoints based on a current location of the mobile device, according to one embodiment. As shown, the method 605 begins at step 605 where the endpoint resolution service receives a request from an application on a mobile device for a set of service endpoints. At step 610, the endpoint resolution service identifies a public IP addresses from the request and an application ID associated with the requesting application.

At step 615, the endpoint resolution service identifies, for each web service, what cloud computing regions are specified in region configuration data associated with the application. The endpoint resolution service then selects at least one of these cloud computing regions, for each service, and returns a corresponding service endpoint to the mobile application for each selected cloud computing region.

At step 620, the endpoint resolution service may determine a distance between each candidate cloud computing region and the determined location of the mobile device. In one embodiment, the endpoint resolution service may also sort the determined distances by service and distance. Alternatively, in some cases, the service endpoints for a given web service may be selected based on an estimated latency for the requesting mobile device to access the given web service.

At step 625, for each web service, the endpoint resolution service returns one or more service endpoints which correspond to cloud computing regions that are closest in geographic proximity to the determined location of the mobile device (and which host an instance of the web service). As illustrated above, each service endpoint may be specified using a network location of the corresponding web service, such as a domain name corresponding to an instance of the web service in the corresponding cloud computing region At step 630, the endpoint resolution service may update location statistics regarding the determined location of the requesting device. Over time, such statistics may be used to identify the current geographic distribution of users, changes in such a distribution over time, as well as other statistics (e.g., observations of latency between the mobile application and a cloud computing region hosting the endpoint resolution service).

Figure 7:
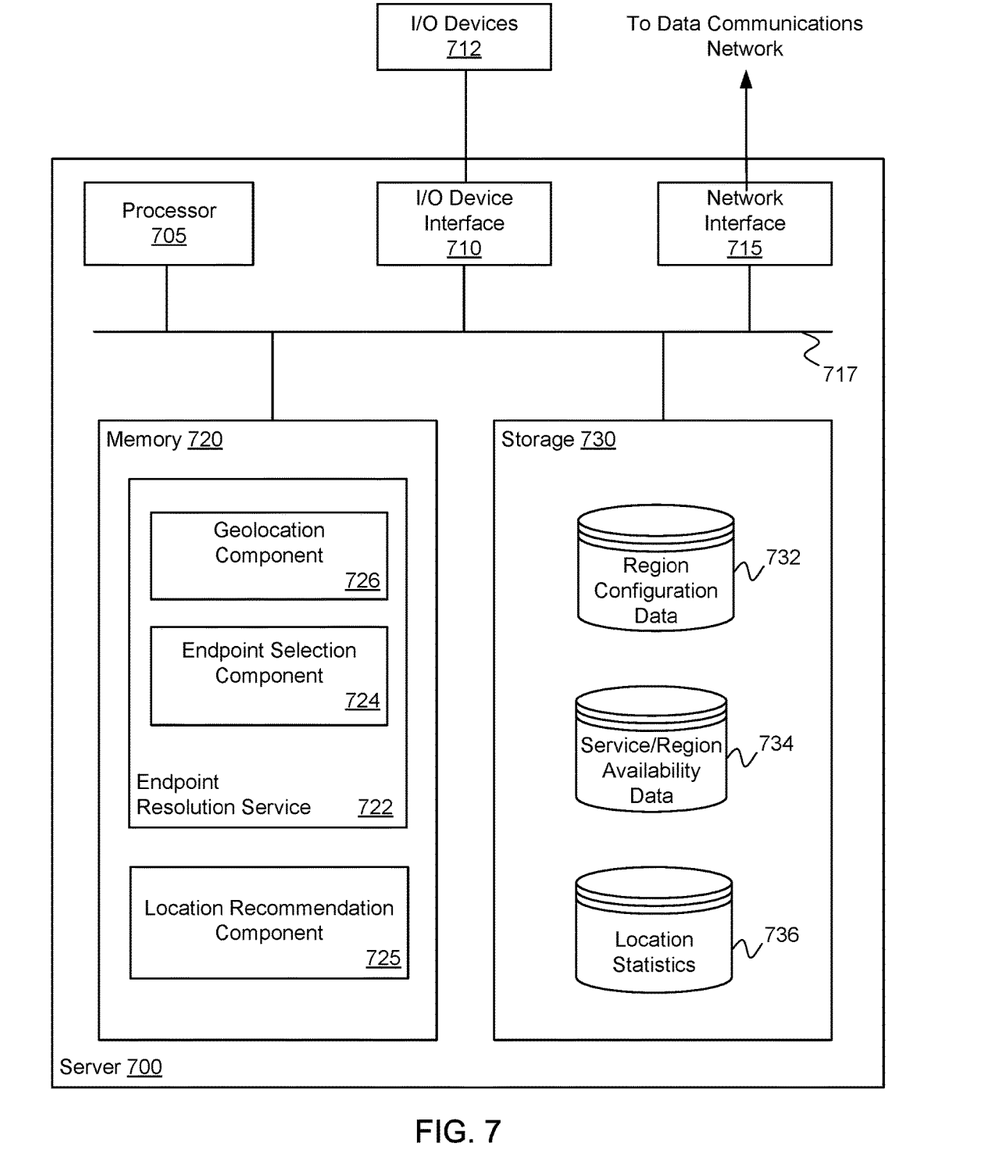
FIG. 7 illustrates an example computing system used to host a global endpoint resolution service which provides mobile devices with service endpoints for web services based on mobile device location, according to one embodiment.

FIG. 7 illustrates an example computing system 700 used to host a global endpoint resolution service 722 which provides mobile devices with service endpoints for web services based on mobile device location, according to one embodiment. As shown, the computing system 700 includes, without limitation, a central processing unit (CPU) 705, a network interface 715, a memory 720, and storage 730, each connected to a bus 717. The computing system 700 may also include I/O device interface 710 connecting I/O devices 712 (e.g., keyboard, display and mouse devices) to the computing system 700. Further, in context of this disclosure, the computing elements shown in computing system 700 may correspond to a physical computing system a laptop or desktop or a virtual computing instance executing within a computing cloud.

The CPU 705 retrieves and executes programming instructions stored in the memory 720 as well as stored in the storage 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes the endpoint resolution service 722 and a location recommendation component 725. Storage 730 includes region configuration data 732, sever/region availability data 724, and location statistics 736. As described, the endpoint resolution service 722 may use the geolocation component 726 to determine a location of a mobile application requesting a set of service endpoints and use the endpoint selection component 724 to determine a set of service endpoints to return to the requesting application. The particular service endpoints may be based on geographic proximity of a mobile device and the available cloud computing regions (or estimates of network latency between the mobile device and the available cloud computing regions). In some cases, the region configuration data 732 for the mobile application could specify a 'global stack' for some of the web services used by the application—meaning that an instance of that web service provisioned for the mobile application is available from each data center or cloud computing region in which the provider offers the underlying web service. To select a service endpoint for web services specifying the 'global stack' attribute, the endpoint selection component 724 may use the service/region availability data 734 to determine what service endpoints to send to the requesting application. The location recommendation component 725 may evaluate location statistics 736 to determine a geographic distribution of users for a given mobile application and, potentially, recommend changes in the region configuration data 732 based on the geographic distribution.

Figure 8:
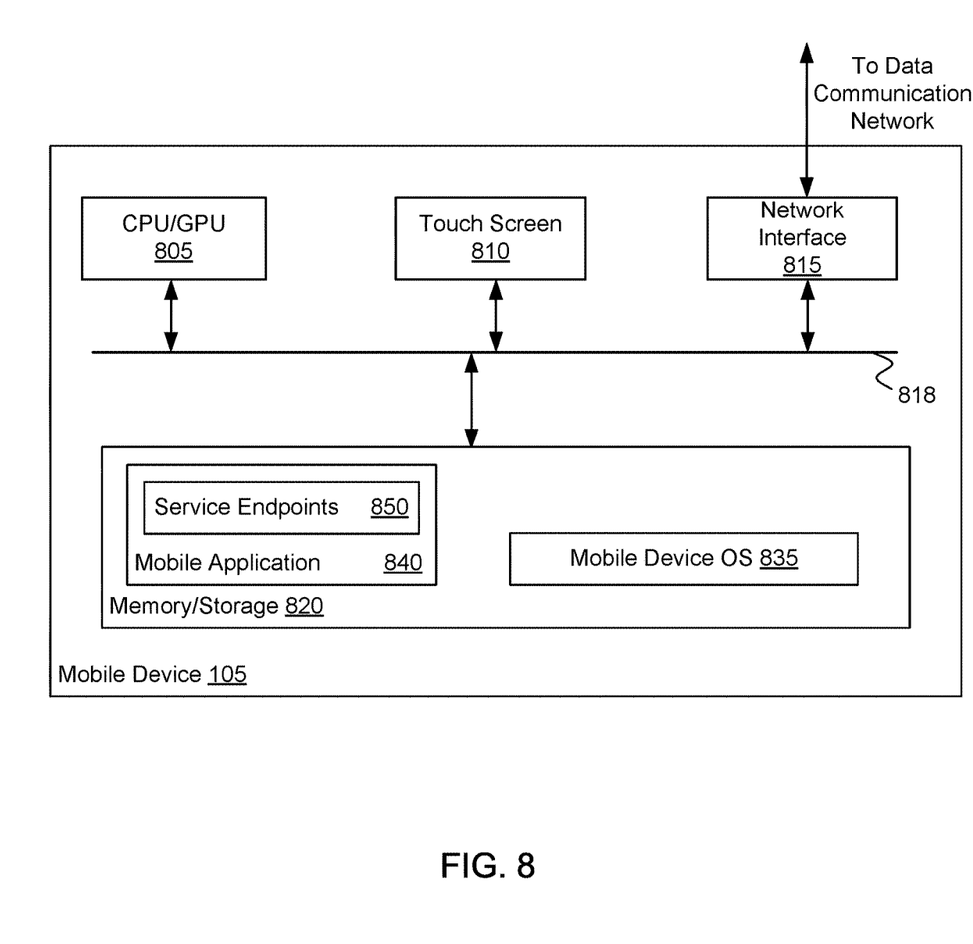
FIG. 8 illustrates an example of a mobile device executing an application that dynamically requests service endpoints for web services, according to one embodiment.

FIG. 8 illustrates an example of a mobile device executing an application that dynamically requests service endpoints for web services, according to one embodiment. As shown, the computing device 800 includes a central processing unit and graphics processing unit (CPU/GPU) 805, network or radio interfaces 815, each connected to memory and storage components 820. Of course, an actual handheld device (e.g., a smartphone or computing tablet) will include a variety of additional hardware and software components. The CPU/GPU 805 retrieves and executes programming instructions stored in the memory and storage components 820. An interconnect 825 is used to transmit instructions and data between the CPU/GPU 805, memory and storage components 820, network interfaces 815. CPU/GPU 805 is included to be representative of a single CPU, multiple CPUs, a single CPU having multiple processing cores and a GPU used to render graphics data presented on display screen 810 of computing device 800. The memory and storage components 820 are generally included to be representative of storage subsystems found on mobile computing devices, e.g., DDR and flash memory modules.

Illustratively, the memory and storage components 820 include a mobile device OS 835, a mobile application 840, and service endpoints 850. The mobile OS 835 provides system software used to manage the hardware components on device 800 and the execution of application programs on the computing device 800. As described, the mobile application 840 may send a request to an endpoint resolution service, e.g., upon application launch, to obtain a set of service endpoints 850 used by the mobile application 840 to access a set of web services integrated as part of the intended use or function of the mobile application 840.

Advantageously, embodiments described herein disclose an endpoint resolution service used to provide a mobile application with a set of service endpoints for web services used by the application. To do so, the endpoint resolution service may use a geolocation service to determine a then-current location of a mobile device and select service endpoints based on the proximity of the mobile device to different data centers or cloud computing regions which host the web services needed by the mobile application. This approach allows a mobile application to always interact with web services deployed in cloud computing regions which are closest in proximity to the mobile device running the application, regardless of the location of the mobile device. Further, the geocoding service may return a redundant or next-closest endpoint for each service. Doing so may improve the availability of application, e.g., in cases where a one cloud computing region (or service in that region) is temporarily unavailable, the mobile application can choose the next-closest service end-point for higher availability.

Note, the above descriptions of embodiments of the present invention have been presented for purposes of illustration, but are not intended to be limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation for selecting service endpoints for a first mobile application on a mobile computing device, the operation comprising:
   receiving, from the first mobile application on the mobile computing device, and by a global endpoint resolution service having a global service endpoint, a request for a regional service endpoint for a desired web service available from one or more cloud computing regions of a plurality of cloud computing regions, the request including an identifier associated with the first mobile application, wherein the first mobile application was deployed without requiring a static binding between the desired web service and the regional service endpoint, wherein the first mobile application has a region configuration specifying for the desired web service to be dynamically selected by the global endpoint resolution service;
   determining a location of the mobile computing device by operation of one or more computer processors when executing the instructions and based on at least a network address of the mobile computing device identified in the request;
   dynamically selecting, by evaluating a proximity criterion based on both the determined location and the region configuration of the first mobile application, a regional service endpoint referencing a cloud computing regions hosting the desired web service; and
   returning, in response to the request, a response specifying the selected regional service endpoint to the first mobile application, wherein the first mobile application is configured to access the desired web service via the selected regional service endpoint, the desired web service returning a result that is output via the first mobile application;
   wherein a given mobile application, selected from the first mobile application and a second mobile application, includes a region configuration setting that specifies a static binding between a specified web service and a desired regional service endpoint, wherein the given mobile application is configured to access the specified web service via the desired regional service endpoint and without requiring the desired regional service endpoint to be dynamically selected by the global endpoint resolution service.

2. The non-transitory computer-readable medium of claim 1, wherein the operation further comprises replicating data associated with the desired web service accessed by the first mobile application in one or more additional cloud computing regions hosting an instance of the desired web service.

3. The non-transitory computer-readable medium of claim 1, wherein the response includes primary and secondary regional service endpoints referencing distinct cloud computing regions hosting the desired web service, the primary regional service endpoint comprising the selected regional service endpoint, wherein the secondary regional service endpoint is also dynamically selected by evaluating the proximity criterion;
   wherein the first mobile application is further configured to, upon subsequently determining that the primary regional service endpoint is at least temporarily unavailable, access the desired web service via the secondary regional service endpoint without requiring further intervention by the global endpoint resolution service.

4. The non-transitory computer-readable medium of claim 1, wherein the operation further comprises recording an indication of the determined location of the mobile computing device.

5. The non-transitory computer-readable medium of claim 4, wherein the operation further comprises generating, based on at least a determined location for a plurality of mobile computing devices in requesting service endpoints, a recommendation of at least a first one of the plurality of cloud computing regions to include in the region configuration of the first mobile application for the desired web service.

6. The non-transitory computer-readable medium of claim 1, wherein the location of the mobile computing device is determined each time the first mobile application is launched on the mobile computing device, wherein the regional service endpoint for the desired web service is selected each of a plurality of times the first mobile application is launched on the mobile computing device, wherein the first mobile application was deployed without requiring a static binding between any web service and any regional service endpoint, wherein the desired web service comprises a first web service, wherein the specified web service is selected from the first web service and a second web service.

7. The non-transitory computer-readable medium of claim 6, wherein the operation is performed by the global endpoint resolution service, the global endpoint resolution service having a plurality of components including:
   (i) a geolocation service component configured to determine a country code, a city name, a region, and geospatial coordinates associated with the network address, the network address comprising an Internet Protocol (IP) address; and (ii) a region recommender component configured to generate recommendations as to proposed cloud computing regions for the first mobile application in order to reduce a processing overhead of replicating services and data of the first mobile application to cloud computing regions with fewer users relative to additional cloud computing regions, and in order to reduce perceived latency and improve availability and reliability of the first mobile application when used in conjunction with the proposed cloud computing regions.

8. The non-transitory computer-readable medium of claim 7, wherein the plurality of components of the global endpoint resolution service further includes:

(iii) an endpoint selection component configured to: (A) estimate a measure of latency of each cloud computing region based on a location determined for the mobile computing device and (B) determine, based on the measure of latency estimated for each cloud computing region, at least one cloud computing region satisfying a predefined criterion for proximity to the mobile computing device; and (iv) the global service endpoint component configured to provide a domain name for a load balancing service for the global endpoint resolution service.

9. The non-transitory computer-readable medium of claim 8, wherein the global endpoint resolution service is replicated across each of the plurality of cloud computing regions, wherein each of the plurality of cloud computing regions includes:

(i) a mobile application replication service configured to replicate services and data used by the first mobile application to additional cloud computing regions;

(ii) mobile application backend services comprising web services configured to provide functionality supporting the first mobile application; and (iii) regional service endpoints, each of which provides a domain name for a load balancing service for the mobile application backend services.

10. The non-transitory computer-readable medium of claim 9, wherein the mobile application backend services have a plurality of components including:

(i) a sign-in service component configured to perform user authentication;

(ii) a cloud-based logic component configured to execute one or more routines associated with the first mobile application;

(iii) a database service component configured to store metadata associated with the first mobile application;

(iv) a storage service configured to store data associated with the first mobile application; and (v) an analytics service component configured to generate usage and performance metrics of the first mobile application across a set of users, the usage and performance metrics including a new user count, a returning user count, application revenue, user retention, and user geographic distribution;

wherein each of the plurality of components of the mobile application backend services has a respective regional service endpoint.

11. The non-transitory computer-readable medium of claim 10, wherein the response specifies, for the selected service endpoint, a service type, a region, an endpoint domain name, and a protocol, wherein the first mobile application comprises a digital photo sharing application, wherein the mobile computing device comprises a smartphone, wherein the operation further comprises:

replicating data associated with the desired web service accessed by the first mobile application in one or more additional cloud computing regions hosting an instance of the desired web service;

recording an indication of the determined location of the mobile computing device;

generating, based on at least a determined location for a plurality of mobile computing devices in requesting service endpoints, a recommendation of at least a first cloud computing region to include in the region configuration of the first mobile application for at least the desired web service, the plurality of mobile computing devices including the mobile computing device.

12. The non-transitory computer-readable medium of claim 11, wherein the response includes primary and secondary regional service endpoints referencing distinct cloud computing regions hosting the desired web service, the primary regional service endpoint comprising the selected regional service endpoint, wherein the secondary regional service endpoint is also dynamically selected by evaluating the proximity criterion;

wherein the first mobile application is further configured to, upon subsequently determining that the primary regional service endpoint is at least temporarily unavailable, access the desired web service via the secondary regional service endpoint without requiring further intervention by the global endpoint resolution service;

wherein the primary regional service endpoint identifies a network location of the desired web service in a first cloud computing region of the plurality of cloud computing regions, wherein the secondary regional service endpoint identifies a network location of the desired web service in a second cloud computing region of the plurality of cloud computing regions, wherein the distinct cloud computing regions are selected from the plurality of cloud computing regions, wherein the desired regional service endpoint comprises the secondary regional service endpoint.

13. The non-transitory computer-readable medium of claim 1, wherein the proximity criterion comprises at least one of (i) a geographic proximity between the mobile computing device and the cloud computing region and (ii) an estimated latency for data communications between the mobile computing device and the cloud computing region.

14. A computing system to select service endpoints for a first mobile application executing on a mobile computing device, the computing system comprising:

one or more computer processors; and a memory containing one or more applications executable by the one or more computer processors to perform an operation, the one or more applications including a global endpoint resolution service having a global service endpoint, the operation comprising:

receiving, from the first mobile application on the mobile computing device, a request for a regional service endpoint for a desired web service available from one or more cloud computing regions of a plurality of cloud computing regions, the request including an identifier associated with the first mobile application, wherein the first mobile application was deployed without requiring a static binding between the desired web service and the regional service endpoint, wherein the first mobile application has a region configuration specifying for the desired web service to be dynamically selected by the global endpoint resolution service;

determining a location of the mobile computing device based on at least a network address of the mobile computing device identified in the request;

dynamically selecting, by evaluating a proximity criterion based on both the determined location and the region configuration of the first mobile application, a regional service endpoint referencing a cloud computing regions hosting the desired web service; and returning, in response to the request, a response specifying the selected regional service endpoint to the first mobile application, wherein the first mobile application is configured to access the desired web service via the selected regional service endpoint, the desired web service returning a result that is output via the first mobile application;

wherein a given mobile application, selected from the first mobile application and a second mobile application, includes a region configuration setting that specifies a static binding between a specified web service and a desired regional service endpoint, wherein the given mobile application is configured to access the specified web service via the desired regional service endpoint and without requiring the desired regional service endpoint to be dynamically selected by the global endpoint resolution service.

15. The computing system of claim 14, wherein the operation further comprises replicating data associated with the desired web service accessed by the first mobile application in one or more additional cloud computing regions hosting an instance of the desired web service.

16. The system of claim 14, wherein the response includes primary and secondary regional service endpoints referencing distinct cloud computing regions hosting the desired web service, the primary regional service endpoint comprising the selected regional service endpoint, wherein the secondary regional service endpoint is also dynamically selected by evaluating the proximity criterion;

wherein the first mobile application is further configured to, upon subsequently determining that the primary regional service endpoint is at least temporarily unavailable, access the desired web service via the secondary regional service endpoint without requiring further intervention by the global endpoint resolution service.

17. The computing system of claim 14, wherein the proximity criterion comprises a geographic proximity between the mobile computing device and the cloud computing region.

18. The computing system of claim 14, wherein the proximity criterion comprises an estimated latency for data communications between the mobile computing device and the cloud computing region.

19. A computer: implemented method to select service endpoints for a first mobile application on a mobile computing device, the computer-implemented method comprising:

receiving, from the first mobile application on the mobile computing device, and by a global endpoint resolution service having a global service endpoint, a request for a regional service endpoint for a desired web service available from one or more cloud computing regions of a plurality of cloud computing regions, the request including an identifier associated with the first mobile application, wherein the first mobile application was deployed without requiring a static binding between the desired web service and the regional service endpoint, wherein the first mobile application has a region configuration specifying for the desired web service to be dynamically selected by the global endpoint resolution service;

determining a location of the mobile computing device by operation of one or more computer processors and based on at least a network address of the mobile computing device identified in the request;

dynamically selecting, by evaluating a proximity criterion based on both the determined location and the region configuration of the first mobile application, a regional service endpoint referencing a cloud computing regions hosting the desired web service;

returning, in response to the request, a response specifying the selected regional service endpoint to the first mobile application, wherein the first mobile application is configured to access the desired web service via the selected regional service endpoint, the desired web service returning a result that is output via the first mobile application;

wherein a given mobile application, selected from the first mobile application and a second mobile application, includes a region configuration setting that specifies a static binding between a specified web service and a desired regional service endpoint, wherein the given mobile application is configured to access the specified web service via the desired regional service endpoint and without requiring the desired regional service endpoint to be dynamically selected by the global endpoint resolution service.

20. The computer implemented method of claim 19, wherein the response includes primary and secondary regional service endpoints referencing distinct cloud computing regions hosting the desired web service, the primary regional service endpoint comprising the selected regional service endpoint, wherein the secondary regional service endpoint is also dynamically selected by evaluating the proximity criterion;

wherein the first mobile application is further configured to, upon subsequently determining that the primary regional service endpoint is at least temporarily unavailable, access the desired web service via the secondary regional service endpoint without requiring further intervention by the global endpoint resolution service.

21. The computer implemented method of claim 19, wherein the proximity criterion comprises a geographic proximity between the mobile computing device and the cloud computing region.

* * * * *

UNITED STATES PATENT AND TRADEMARK OFFICE
CERTIFICATE OF CORRECTION

PATENT NO. : 10,511,675 B1
APPLICATION NO. : 14/971491
DATED : December 17, 2019
INVENTOR(S) : Andrew Christopher Chud Page 1 of 1

It is certified that error appears in the above-identified patent and that said Letters Patent is hereby corrected as shown below:

In the Claims

In Column 13, Line 66, in Claim 1, delete "regions" and insert -- region --, therefor.

In Column 17, Line 10, in Claim 14, delete "regions" and insert -- region --, therefor.

In Column 17, Line 55, in Claim 19, delete "computer: implemented" and insert -- computer-implemented --, therefor.

In Column 18, Line 21, in Claim 19, delete "regions" and insert -- region --, therefor.

Signed and Sealed this
Seventh Day of April, 2020

Andrei Iancu
*Director of the United States Patent and Trademark Office*